UNITED STATES PATENT OFFICE.

JOHN VON DER KAMMER, OF WASHINGTON, DISTRICT OF COLUMBIA, ASSIGNOR TO BERTHA VON DER KAMMER, OF WASHINGTON, DISTRICT OF COLUMBIA.

METABOLISM OF SEED.

No. 899,306.  Specification of Letters Patent.  Patented Sept. 22, 1908.

Application filed June 12, 1908. Serial No. 438,130.

*To all whom it may concern:*

Be it known that I, JOHN VON DER KAMMER, a citizen of the United States, residing at Washington, District of Columbia, have invented certain new and useful Improvements in Metabolism of Seed, of which the following is a specification.

My invention relates to an improved method for the metabolism of vegetable seeds and the artificial growth of plants therefrom without soil, to the extent of lateral root formation and stem development thereon, and to a condition of growth commonly known as seedlings. Young plants so developed constitute a very valuable food both for man as well as for domestic animals, the dry components of the dormant seed being changed by such metabolism and growth, and the plants when eaten enter the digestive organs in aqueous and assimilable live-plant form, resulting in improved digestion and increased nutrition and correspondingly enhanced health. The feeding of such plants as stock food for animals also produces a marked improvement in the quality of the meat, as well as other animal food products.

As the result of my experiments I have found that the metabolism of seed and the growth of plants therefrom may be accomplished without soil in an inclosure in which the presence and action of atmospheric air is restricted and suppressed and the seed practically surrounded by an anaërobic atmosphere in conjunction with artificial nutrition.

In my co-pending application for metabolizers, Serial Number 425,774, filed April 7, 1908, and on which Patent 891,176, issued to me June 16, 1908, I fully describe the construction of suitable anaërobic chambers for the use of the process of this application, and also refer to the drawings in that application for the details of construction. The seeds to be metabolized under this process should not be steeped or soaked for any length of time, as this would cause the destruction of bacteria originating from the seed coats of the seeds and the loss of organic matter from the seeds, both of which I have found to be of great importance and expedient in the early stages of the development of life within the seed. Furthermore, the moisture applied to the chamber and to the seeds should be regulated as not to water-log the seeds, which also interferes with the action of such bacteria which may be observed by the seed coats becoming slimy or slippery to the touch.

For a further expedient of my process I introduce into the anaërobic chamber an anaërobic gas, preferably free nitrogen which may be produced in any desired manner, or may consist of any other nitrogenous gas having in combination nitrogen and hydrogen.

In order to prevent the undesirable action of oxygen which may leak into the apparatus an alkaline solution of pyrogallic acid may be conveniently placed within the apparatus or chamber.

For a further expedient of my process I introduce into the anaërobic chamber such organisms and bacteria as may be obtained from an extraction of a suitable soil or may be cultivated in a proper manner.

I do not aim to provide specific soil bacteria for performing specific actions or results, but subject the seeds to the bacteria flora of a fertile soil such as will thrive in an artificial culture under anaërobic conditions.

Describing the culture of the bacteria, I dissolve two hundred gr. potassium phosphate in ten thousand c. c. water into which is stirred one hundred and fifty gr. calcium carbonate and the entire liquid is siphoned off after settling. Into this I put two hundred gr. of dextrose and five hundred gr. of an extraction from a mixture of germinated seeds, preferably wheat, corn and vetches, which has been filtered and sterilized. All this is put into a vessel having an air tight cover and preferably of stoneware, as glass or metal vessels are not well suited for the purpose. In the meantime an extraction of black pasture soil has been prepared in the following manner: To approximately two gallons of water I add enough of the black pasture soil to make a semi-liquid mass. After twenty-four hours I decant the water and allow it to precipitate when it is conveyed into a tightly covered vessel, when it is ready for use. I have found that the bacteria obtained from black pasture soil are well adapted for my purpose, the anaërobic conditions surrounding the bacteria in this character of soil more closely approximating the conditions to which such bacteria are to be subjected in the apparatus which I employ. The extraction so prepared is then added to the previous liquids and the entire mixture is then made neutral, preferably slightly alkaline, by adding a sufficient amount of an extraction of wood ashes. The liquid is then placed in a tightly covered vessel, and remains therein for about four days in a temperature of about 35° C. In about four days the liquid becomes turbid, which shows the degree of development of the micro-organisms; in the general practice, especially in large plants, the operator will be guided by the turbidness of the liquid in his operations. For each new batch of grain a supply of this liquid is put in the tray-like depressions of the apparatus, but the waste liquids from the apparatus containing valuable extractions are collected, filtered by vacuum pump, sterilized, and used over and over again in the continuous culture of organisms.

The liquid or bath directly used on the seed I prepare from a solution of potassium phosphate, carbonate of lime and commercial fertilizers containing soluble potassium, phosphoric acid and nitrogen also neutralized by an extract of wood-ashes and which is put into a tank holding water at a proportion of one part of liquid to five thousand of water, which means the combined weight of the dissolved chemicals to the weight of the water. The condition of the micro-organisms which indicates that for one reason or another they have become spoiled is also shown by a slimy touch of the seed. In such case a new carefully prepared culture must be obtained and the apparatus thoroughly cleaned.

A microscopical examination of the organisms shows from round to rod-like ramifying bodies arranged in different formations and groups and among which can be detected well known specific forms, but to which in my practice I do not pay specific attention.

The main purpose of the use of the micro-organisms and the chemical means employed by me is the accomplishing of the proteolysis of the seed, which result I have found to be thereby effected.

Cultures of bacteria of divers description, and for the purpose of inoculating seed of the legumes, or the soil in which they are to be planted, are now distributed by agricultural institutions and are sold in the market as merchandise and which in a further culture under anaërobic conditions, especially in a culture containing extracts of germinated seed, as I have set forth, may be usefully employed in connection with my apparatus.

Seeds thus subjected to the divers treatments as above set forth develop rapidly into young plants of healthy conditions and which increase their structural and living matter and grow sufficient root formation which fits them to be used as food or to be transplanted into the ground where they will continue to develop.

Hereinbefore I have specified certain forms of the chemical elements of phosphor, potassium nitrogen and organic carbonaceous matter which I have found to furnish the available material for the development of the plants and at the same time sustaining the actions and development of soil organisms in the anaërobic chamber and which chemical elements I use preferably in conjunction with the element calcium in soluble form, all of which have given to me the best results, but I am fully aware that these chemical elements may be used in other forms and in different proportions than I have set forth without altering materially the results. I have also found that other chemical compounds derived from the alkaline earths or alkaline metals may be added to the treatment I have described, but which I also found in most cases without materially benefiting the process, but I have found that after the plants are in an advanced state of development they may be subjected to a treatment from which they absorb and incorporate into their make-up iron, iodin and other elements which have a salutary effect in diseases and disorders of the stock.

I claim:

1. The metabolism of seed for the artificial development of plant-life therefrom without soil, produced by placing the seed in an anaërobic chamber and periodically moistening the seed with a liquid nutrient media.

2. The metabolism of seed for the artificial development of plant-life therefrom without soil, produced by placing the seed in an anaërobic chamber containing an anaërobic gas and periodically moistening the seed with a liquid nutrient media.

In testimony whereof I affix my signature in presence of two witnesses.

JOHN VON DER KAMMER.

Witnesses:
R. LOUISE NORTON,
L. B. BAKER.